US006239693B1

(12) United States Patent
Benard et al.

(10) Patent No.: US 6,239,693 B1
(45) Date of Patent: May 29, 2001

(54) SECURITY SYSTEM FOR A MOTOR VEHICLE OPENING LEAF COMPRISING A PROTECTIVE COVER

(75) Inventors: Thierry Benard, Paris (FR); Luc Josserand, Turin (IT)

(73) Assignee: Valeo Securite Habitacle, Creteil Cedex (FR)

( * ) Notice: Subject to any disclaimer, the term of this patent is extended or adjusted under 35 U.S.C. 154(b) by 0 days.

(21) Appl. No.: 09/354,194

(22) Filed: Jul. 15, 1999

(30) Foreign Application Priority Data

Jul. 17, 1998 (FR) ..... 98 09191

(51) Int. Cl.[7] ..... B60R 25/10

(52) U.S. Cl. ..... 340/426; 340/555; 362/501; 296/146.7

(58) Field of Search ..... 340/426, 555, 340/556, 545.6, 545.7, 565, 542; 296/146.5, 146.6, 151, 146.7; 307/10.1, 10.2, 117; 362/501; 200/61.02, 61.85

(56) References Cited

U.S. PATENT DOCUMENTS

| | | | |
|---|---|---|---|
| 1,721,347 * | 7/1929 | Macrae et al. | 362/501 |
| 2,904,671 * | 9/1959 | Johnston | 362/501 |
| 4,590,410 * | 5/1986 | Jönsson | 340/555 |
| 4,728,143 * | 3/1988 | Tanino et al. | 296/146.7 |
| 4,800,648 * | 1/1989 | Nakayama et al. | 296/146.7 |
| 4,893,867 * | 1/1990 | Hilborn et al. | 296/39.1 |
| 5,528,355 | 6/1996 | Maase et al. | 356/71 |
| 5,682,135 | 10/1997 | Labonde | 340/426 |

FOREIGN PATENT DOCUMENTS

| | | |
|---|---|---|
| 42 12 291 | 10/1993 | (DE) . |
| 196 17 038 | 11/1997 | (DE) . |
| 2 572 160 | 4/1986 | (FR) . |

OTHER PUBLICATIONS

French Search Report dated Mar. 2, 1999.

* cited by examiner

*Primary Examiner*—Jeffery Hofsass
*Assistant Examiner*—John Tweel, Jr.
(74) *Attorney, Agent, or Firm*—Morgan & Finnegan LLP

(57) ABSTRACT

The invention relates to a security system for a motor vehicle opening leaf comprising means for detecting, remotely, the presence of a user's hand near the handle of the opening leaf, the detection means comprising at least one sensor (32, 34) capable of emitting or of receiving an electromagnetic signal, borne by an internal module (36) which bears the sensor (32, 34) in such a way that the sensor (32, 34) is opposite an opening made in the bodywork panel (12). The security system further comprises a cover. The opening in the bodywork panel (12) is blanked off by a cover (40) made of a material that is transparent to the electromagnetic signal, the cover (40) being secured against an external face of the bodywork panel.

20 Claims, 2 Drawing Sheets

SECURITY SYSTEM FOR A MOTOR VEHICLE OPENING LEAF COMPRISING A PROTECTIVE COVER

BACKGROUND OF THE INVENTION

The invention relates to a security system for a motor vehicle opening leaf.

The invention relates more specifically to a security system for an opening leaf of a motor vehicle of the type in which the opening leaf is held in the closed position by a lock which is operated by means of a handle arranged on the outside of a bodywork panel of the opening leaf, of the type in which the security system comprises means for detecting, remotely, by means of an electromagnetic signal, the presence of a user's hand near the handle, and of the type in which the detection means comprise a control circuit and at least one sensor capable of emitting or of receiving the electromagnetic signal.

Such a system is described, for example, in document FR-A-2,733,783. The system described in this document proposes the use, as a means of detecting the presence of the hand, of an infrared-radiation sensor. This sensor "observes" an area in space around the handle so that when a user's hand approaches it, the infrared radiation emitted by the hand is picked up and analyzed by the sensor which is then capable of transmitting control information to an antitheft unit.

However, the invention can also be implemented in the context of a security system in which the detection means comprise an emitter which emits an electromagnetic signal intended to be received by a receiver, the path of the signal between the emitter and the receiver running, at least in part, on the outside of an external panel of the opening leaf. In this case, the presence of the hand is detected when the hand intercepts the path of the signal because, at that instant, the signal is no longer received by the receiver.

In this case, the signal may, for example, be infrared radiation.

In such a system, it is therefore necessary for the sensor or sensors to be able to "see" the environment on the outside of the handle. However, there is good cause to ensure that the detection means control circuit should itself be arranged on the inside of the bodywork panel of the opening leaf, for obvious esthetic reasons.

BRIEF SUMMARY OF THE INVENTION

The object of the invention is therefore to propose a new design of such a system which simultaneously allows for good integration into the overall style of the vehicle, and makes the system easier to mount, allowing the cost of performing this operation to be reduced, while at the same time guaranteeing that the mounting and the system are reliable, particularly by achieving a good seal to prevent dust or moisture from being able to disrupt the operation of the system.

To this end, the invention proposes a security system for an opening leaf of a motor vehicle of the type in which the opening leaf is held in the closed position by a lock which is operated by means of a handle arranged on the outside of a bodywork panel of the opening leaf, of the type in which the security system comprises means for detecting, remotely, by means of an electromagnetic signal, the presence of a user's hand near the handle, and of the type in which the detection means comprise a control circuit and at least one sensor capable of emitting or of receiving the electromagnetic signal wherein the hand-detection means comprise an internal module which bears the sensor and which is arranged on the inside of the bodywork panel in such a way that the sensor is opposite an opening made in the bodywork panel, and the opening in the bodywork panel is blanked off by a cover which is made of a material that is transparent to the electromagnetic signal, the cover being secured against an external face of the bodywork panel.

According to other features of the invention:

- the cover comprises an external transverse wall which bears against the external face of the bodywork panel, and a tubular skirt which extends transversely inward from the external transverse wall through the opening in the bodywork panel and which cooperates in a sealed fashion with a casing of the internal module;
- the tubular skirt extends around a lateral external wall of the casing, and a seal is inserted between the skirt and the lateral external wall of the casing;
- the seal is borne by the skirt of the cover;
- the seal is borne by the casing of the internal module;
- the cover is secured to the bodywork panel;
- the cover is fixed to the bodywork panel by elastic push-fitting means;
- the cover is fixed to the bodywork panel by adhesive bonding.

BRIEF DESCRIPTION OF THE DRAWINGS

Other features and advantages of the invention will emerge from reading the detailed description which follows, for an understanding of which reference will be made to the appended drawings, in which.

DETAILED DESCRIPTION OF THE INVENTION

Figure 1:
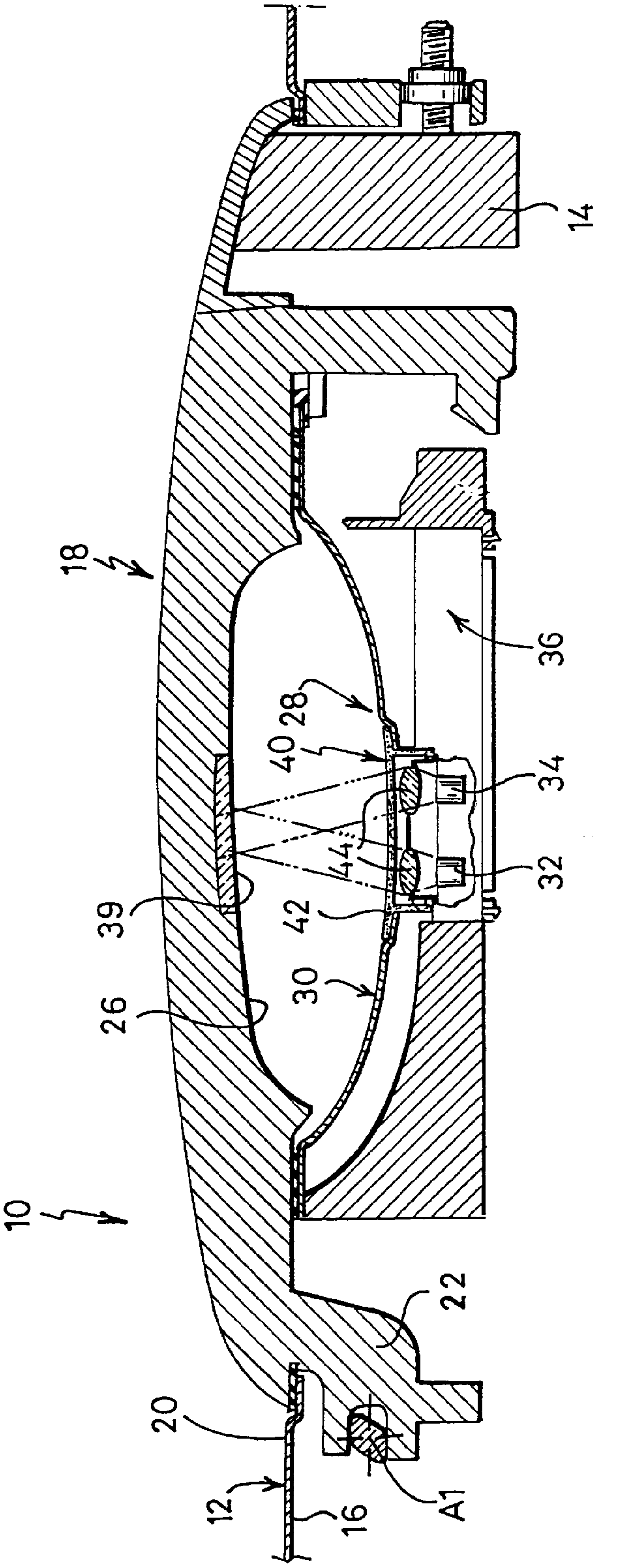
FIG. 1 is a diagrammatic view in section on a horizontal plane of a motor vehicle handle comprising a security system in accordance with the teachings of the invention.

FIG. 1 illustrates a handle 10 for a motor vehicle opening leaf.

The handle 10 is intended to be mounted on an external bodywork panel 12 of the opening leaf. It essentially comprises a handle support 14 which is fixed on an inside face 16 of the panel 12, and a lever 18 for grasping, which is arranged on the outside face 20 of the panel 12, but which is articulated to the support 14 about an axis A1 substantially parallel to a general plane of the panel 12. The direction of the axis A1 will arbitrarily be termed vertical while the direction perpendicular to the axis A1, and also parallel to the general plane of the panel 12, will be said to be longitudinal.

Thus, the lever 18, which runs longitudinally, comprises, at a longitudinal front end, an articulation tab 22 which extends toward the inside of the panel 12 through an opening made therein and which is mounted so that it can pivot on the support 14. The lever 18 can therefore be brought from a position of rest, illustrated in FIG. 1, into an opening position (not depicted) in which its longitudinal rear end is moved away from the panel 12 transversely outward and in which the lever 18 actuates a transmission mechanism (not depicted) allowing, for example, a lock which holds the opening leaf in the closed position to be triggered.

To bring the lever 18 into its opening position, the user of the vehicle has to insert his or her hand between the bodywork panel 12 and a surface 26 for grasping of the lever 18 so that this lever can be pulled toward him or her, outward with respect to the panel 12.

For this to be possible there is, between the panel 12 and the lever 18, a space 28 which, in a plane perpendicular to the axis A1, is transversely delimited by an inward depression 30 in the panel 12 and by a surface 26 for grasping of the lever 18, which face one another.

In accordance with the teachings of the invention, the handle 10 according to the invention comprises detection means which allow the presence of the user's hand in the space 28 to be detected before this hand has actually grasped the lever 18 via its surface 26 for grasping, and which are borne by the handle support 14 arranged on the inside face 16 of the panel 12.

More specifically, the detection means comprise, in particular, an emitter 32 and a receiver 34 which are borne by an internal module 36 itself fixed to the handle support 14. The emitter 32 and the receiver 34 are both connected to an electronic control module (not depicted) which is itself also borne by the internal module 36.

According to the invention, the emitter 32 emits a signal of the electromagnetic type which is intended to be received by the receiver 34. The signal is emitted in such a way as to follow a path which runs through the space 28 in such a way that when the user's hand enters this space 28, it necessarily intercepts the path of the signal which means that the transmission of the signal between the emitter 32 and the receiver 34 is interrupted. As the receiver 34 no longer receives the signal, it deduces from this an information item relating to the presence of the hand in this space 28.

The signal emitted by the emitter 32 and received by the receiver 34 is preferably a light signal in the visible range or in the infrared range.

Figure 2:
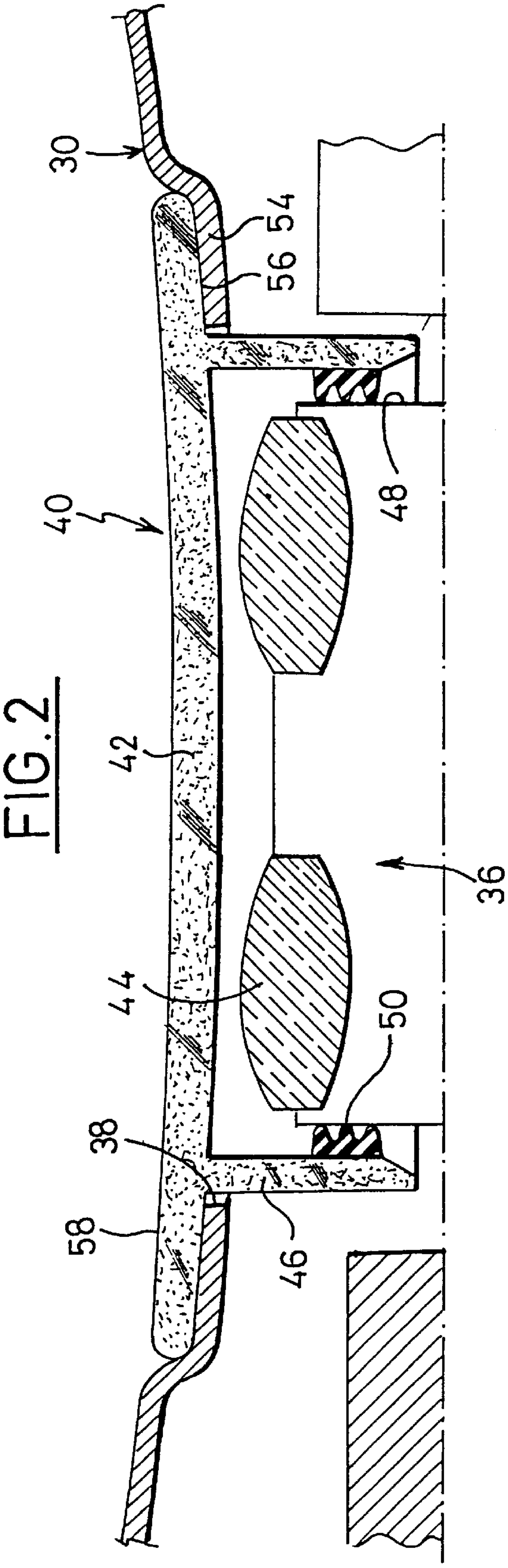
FIG. 2 is a diagrammatic view illustrating, in an enlargement, the cover which blanks off the opening in the bodywork panel.

As can be seen more specifically in FIG. 2, the emitter 32 and the receiver 34 are arranged substantially side by side, parallel to one another, set back toward the inside with respect to the bodywork panel 12.

In accordance with the teachings of the invention, the two sensors 32, 34 are arranged facing an opening 38 (see FIG. 2) which is cut in the depression 30 in the bodywork panel 12. In the embodiment illustrated, they are arranged facing the same opening 38.

The signal emitted by the emitter 32 is therefore directed outward through the opening 38 and there is a reflector 39 borne by the lever 18 of the handle which reflects the signal back toward the receiver 34, again through the opening 38.

The control module which analyzes the signal received by the receiver 34 is therefore capable of detecting an interruption in the signal and, as appropriate, of transmitting a corresponding item of information to a unit for controlling the security system.

According to the invention, the opening 38 is intended to be blanked off by a cover 40, an external transverse wall 42 of which extends substantially parallel to the bodywork panel 12, on the outside thereof.

Of course, the external transverse wall 42 of the cover 40 is made of a material which is transparent to the electromagnetic signal.

In the embodiment of FIG. 2, it can be seen that the internal module 36 also bears, in front of each of the two sensors 32, 34 a lens 44, the purpose of which is to focus and/or deflect the electromagnetic signal emitted by the emitter 32 or received by the sensor 34.

Of course, the two lenses 44 are arranged between the corresponding sensor and the cover 40.

The cover 40 comprises a tubular skirt 46 which extends axially inward from the external transverse wall 42, through the opening 38 in the depression 30 in the panel 12. As can be seen in FIG. 2, the internal axial end of the skirt 46 surrounds an external lateral wall 48 of a casing of the internal module 36. The skirt 46, around the entire periphery of its internal axial end, bears a seal which cooperates with the external face 48 of the casing in such a way that there is delimited, inside the skirt 46, a closed housing protected from any dust or moisture. In this embodiment of the invention, the seal is a lip seal 50 which is borne by the skirt 46 and which presses against the external face 48 of the casing, which is of course of a complementary shape compared with the skirt 46.

Figure 3:
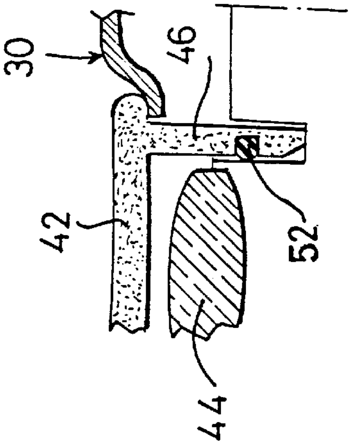
FIG. 3 is a detailed view illustrating an alternative form of the means of sealing between the cover and the casing of the internal module.

In the embodiment of FIG. 3, it can be seen that the seal may also be produced in the form of an O-ring 52 housed in a groove formed in an internal face of the skirt 46. It is also possible to envisage for the seal 50 to be borne by the internal module 36.

In accordance with the teachings of the invention, the internal module 36, which bears the sensors 32, 34, is intended to be mounted from the inside of the bodywork panel 12, but, on the other hand, the cover 40 is intended to be mounted axially from the outside inward, by engaging the skirt 46 through the opening 38.

Thus, the external transverse wall 42 of the cover 40, which is of a larger size than the opening 38, presses via a peripheral edge against the external face 20 of the bodywork panel 12, more specifically against that part thereof which forms the surround of the opening 38. Advantageously, around the opening 38, the bodywork panel 12 has an indentation 54 toward the inside, so that the external transverse wall 42 of the cover 40, which presses via an internal face 56 against the indentation 54, has an external face 58 which is in the continuation of the external face 20 of the panel 18 in the region of the depression 30.

The cover 40 will advantageously be fixed in place by means which cooperate with the bodywork panel 12, which will make it possible simply and reliably to position the cover 40 very appropriately with respect to the panel 12. This ensures that the security system is esthetically integrated into the external style of the vehicle.

Fixing may, for example, be by adhesive bonding, but it is also possible to envisage for the cover 40 to be fitted with elastic push-fit means (not depicted) capable of cooperating, for example, with the edge of the opening 38 in the panel 12.

A particularly advantageous application of the invention consists in using the information about the presence of the hand to trigger, for example, a procedure of identifying the user whose hand is approaching. This procedure, controlled by the control unit and, for example, performed by a device involving transponders, may thus be performed before the user has even grasped hold of the handle lever 18. If the user is an authorized user, the unit may then trigger an operation for unlocking the lock.

What is claimed is:

1. A security system for an opening leaf of a motor vehicle in which the opening leaf is held in the closed position by a lock which a user operates by means of a handle arranged on the outside of a bodywork panel of the opening leaf, the bodywork panel having an opening in an external face, the security system comprising:

means for detecting, remotely, by means of an electromagnetic signal, the presence of a user's hand near the handle, the means for detecting comprising a control circuit, at least one sensor capable of emitting or of receiving the electromagnetic signal, an internal module containing the sensor, said internal module arranged on the inside of the bodywork panel in such a way that the sensor is opposite the opening in the bodywork panel; and a cover blanking the opening in the bodywork panel, the cover made of a material that is transparent to the electromagnetic signal, the cover secured against the external face of the bodywork panel in a sealed fashion with said internal module and forming a substantially continuous plane with the external face of the bodywork panel.

2. A security system as claimed in claim 1, the internal module having a casing, wherein the cover comprises an external wall which bears against the external face of the bodywork panel, and a tubular skirt which extends transversely inward from the external wall through the opening in the bodywork panel and cooperates in a sealed fashion with the casing of the internal module.

3. A security system as claimed in claim 2, the casing having a lateral external wall, wherein the tubular skirt extends around the lateral external wall of the casing, and further including a seal inserted between the tubular skirt and the lateral external wall of the casing.

4. A security system as claimed in claim 3, wherein the seal is borne by the tubular skirt of the cover.

5. A security system as claimed in claim 3, wherein the seal is borne by the casing of the internal module.

6. A security system as claim in claim 1, wherein the cover is secured to the bodywork panel.

7. A security system as claimed in claim 6, further including an elastic push-fitting means, wherein the cover is fixed to the bodywork panel by the elastic push-fitting means.

8. A security system as claimed in claim 6, wherein the cover is fixed to the bodywork panel by adhesive bonding.

9. A vehicle comprising the security system of claim 1.

10. A security system for an opening leaf of a motor vehicle, said opening leaf having a bodywork panel with an opening in an external face and defining an interior, said opening leaf held in a closed position by a lock which a user may operate by means of a handle arranged on said bodywork panel, said security system remotely detecting a user's presence proximate said handle via of an electromagnetic signal, said security system comprising:

a cover blanking said opening in said external face, said cover composed at least partially of a material transparent to said electromagnetic signal, said cover secured against and forming a substantially continuous plane with said external face;

a control circuit; and an internal module including a first sensor capable of emitting said electromagnetic signal and a second sensor capable of receiving said electromagnetic signal, said internal module in communication with said control circuit, said internal module arranged on the interior of said bodywork panel such that said first sensor and said second sensor are disposed opposite said opening in said external face, said internal module cooperating in a sealed fashion with said cover.

11. The security system as claimed in claim 10 wherein said internal module has a casing, said cover further comprising:

an external wall which bears against said external face of said bodywork panel, and a tubular skirt extending transverse said external wall through said opening in said external face, said tubular skirt forming a seal with said casing.

12. The security system as claimed in claim 11, wherein said casing has a lateral external wall and wherein said tubular skirt extends around said lateral external wall, said security system further comprising a seal interposed between said lateral external wall and said tubular skirt.

13. The security system as claimed in claim 12 wherein said seal is borne by one of said casing or said tubular skirt.

14. The security system as claim in claim 10 wherein said cover is secured to said external face of said bodywork panel.

15. The security system as claimed in claim 10 further including an elastic push-fitting, said elastic push-fitting securing said cover to said bodywork panel.

16. The security system as claimed in claim 10 wherein said cover is bonded to said bodywork panel.

17. A vehicle comprising the security system of claim 10.

18. A security system for an opening leaf of a motor vehicle, said opening leaf having a bodywork panel with an opening in an external face and defining an interior, said opening leaf held in a closed position by a lock which a user may operate by means of a handle arranged on said bodywork panel, said security system comprising:

a cover blanking said opening in said external face, said cover composed at least partially of a material transparent to electromagnetic signals and comprising:

an external wall which bears against said external face, and a tubular skirt which extends transversely inward from the external wall through the opening in the bodywork panel and cooperates in a sealed fashion with the casing of the internal module;

an internal module having a lateral external wall around which said tubular skirt of said cover extends and containing a detector that senses the user's presence of proximate said handle, said detector comprising:

a control circuit, at least one sensor capable of emitting an electromagnetic signal, and at least one sensor capable of receiving said electromagnetic signal, said sensors arranged on said inside and opposite said opening, said sensors in communication with said control circuit; and a seal inserted between said tubular skirt of said cover and said lateral external wall of said internal module.

19. The security system of claim 18 wherein the seal is borne by said tubular skirt of said cover or said casing of said internal module.

20. The security system of claim 18 wherein said cover is secured to said bodywork panel by one selected from the group consisting of an elastic push-fitting and bonding material.

* * * * *